(12) United States Patent
Cohen et al.

(10) Patent No.: US 7,586,281 B2
(45) Date of Patent: *Sep. 8, 2009

(54) METHODS AND APPARATUS FOR OPTIMAL VOLTAGE AND FREQUENCY CONTROL OF THERMALLY LIMITED SYSTEMS

(75) Inventors: Aviad Cohen, Netanya (IL); Lev Finkelstein, Netanya (IL); Avi Mendelson, Haifa (IL); Ronny Ronen, Haifa (IL); Dmitry Rudoy, Haifa (IL)

(73) Assignee: Intel Corporation, Santa Clara, CA (US)

( * ) Notice: Subject to any disclaimer, the term of this patent is extended or adjusted under 35 U.S.C. 154(b) by 268 days.

This patent is subject to a terminal disclaimer.

(21) Appl. No.: 11/459,407

(22) Filed: Jul. 24, 2006

(65) Prior Publication Data

US 2006/0273753 A1      Dec. 7, 2006

Related U.S. Application Data

(63) Continuation of application No. 10/934,295, filed on Sep. 3, 2004, now Pat. No. 7,141,953.

(60) Provisional application No. 60/500,561, filed on Sep. 4, 2003.

(51) Int. Cl.
*G05D 23/00* (2006.01)

(52) U.S. Cl. .................. 318/471; 388/934; 388/907.5; 361/103

(58) Field of Classification Search .......... 318/806, 318/471; 388/907.5, 903, 934; 361/103
See application file for complete search history.

(56) References Cited

U.S. PATENT DOCUMENTS 2,475,788 A * 7/1949 Kidder ................. 374/113

3,600,650 A * 8/1971 Obenhaus et al. ........... 257/665

(Continued)

FOREIGN PATENT DOCUMENTS

EP      0699992 A1      3/1996

(Continued)

OTHER PUBLICATIONS

"Enhanced Intel® SpeedStep® Technology for the Intel® Pentium® M Processor", *Intel® White Paper*, Order No. 301170-001, (Mar. 2004), 12 pgs.

(Continued)

*Primary Examiner*—Rina I Duda
(74) *Attorney, Agent, or Firm*—Schwegman, Lundberg & Woessner, P.A.

(57) ABSTRACT

Methods, apparatus, and articles of manufacture control a device or system that has an operational limit related to the rate or frequency of operation. The frequency of operation is controlled at a variable rate calculated to maximize the system or apparatus performance over a calculated period of time short enough that a controlling factor, such as power consumption, does not vary significantly during the period. Known system parameters, such as thermal resistance and capacitance of an integrated circuit (IC) and its package, and measured values, such as current junction temperature in an IC, are used to calculate a time-dependent frequency of operation for the upcoming time period that results in the best overall performance without exceeding the operational limit, such as the junction temperature.

3 Claims, 6 Drawing Sheets

U.S. PATENT DOCUMENTS

| | | | |
|---|---|---|---|
| 4,722,669 A * | 2/1988 | Kundert | 417/32 |
| 5,225,992 A * | 7/1993 | Kobari et al. | 702/58 |
| 5,510,687 A | 4/1996 | Ursworth et al. | |
| 5,550,702 A * | 8/1996 | Schmidt et al. | 361/103 |
| 5,590,061 A | 12/1996 | Hollowell, II et al. | |
| 5,600,575 A * | 2/1997 | Anticole | 702/132 |
| 5,675,297 A | 10/1997 | Gose et al. | |
| 5,831,405 A * | 11/1998 | Massie | 318/471 |
| 5,838,187 A | 11/1998 | Embree | |
| 5,913,552 A | 6/1999 | McLellan | |
| 5,942,866 A * | 8/1999 | Hsieh | 318/268 |
| 5,996,084 A | 11/1999 | Watts | |
| 6,040,668 A * | 3/2000 | Huynh et al. | 318/471 |
| 6,336,080 B1 | 1/2002 | Atkinson | |
| 6,535,798 B1 | 3/2003 | Bhatia et al. | |
| 6,621,678 B2 | 9/2003 | Wei et al. | |
| 7,085,945 B2 | 8/2006 | Silvester | |
| 7,141,953 B2 | 11/2006 | Cohen et al. | |
| 2002/0087896 A1 | 7/2002 | Cline et al. | |
| 2002/0097541 A1* | 7/2002 | Wei et al. | 361/58 |
| 2004/0148528 A1 | 7/2004 | Silvester | |
| 2004/0215988 A1 | 10/2004 | Clabes et al. | |
| 2005/0088137 A1 | 4/2005 | Cohen et al. | |
| 2005/0218480 A1 | 10/2005 | Usui et al. | |
| 2006/0020831 A1 | 1/2006 | Golla et al. | |
| 2006/0136076 A1 | 6/2006 | Rotem et al. | |
| 2007/0061021 A1 | 3/2007 | Cohen et al. | |

FOREIGN PATENT DOCUMENTS

| | | |
|---|---|---|
| EP | 0712064 A1 | 5/1996 |
| WO | WO-98/13935 A1 | 4/1998 |
| WO | WO-03/050663 A2 | 6/2003 |

OTHER PUBLICATIONS

"Mobile Intel® Pentium® III Processors—Intel® SpeedStep® Technology", [online]. [archived Apr. 24, 2004]. Retrieved from the Internet: <URL:http://web.archive.org/web/20050424124900/http://www.intel.com/support/processors/mobile/pentiumiii/sb/CS-007509.htm>, 2 pgs.

Huang, M., et al., "The Design of DEETM: A Framework for Dynamic Energy Efficiency and Temperature Management", *Journal of Instruction-Level Parallelism*, vol. 3, (2002), 1-31.

Skadron, K., et al., "Control-Theoretic Techniques and Thermal-RC Modeling for Accurate and Localized Dynamic Thermal Management", *Proceedings, 8th International Symposium on High-Performance Computer Architecture (HPCA '02)*, (Feb. 2002), 1-12.

Skadron, K., et al., "Temperature-Aware Microarchitecture", *Proceedings, 30th International Symposium on Computer Architecture (ISCA '03)*, (Jun. 2003), 1-12.

Srinivasan, J., et al., "Predictive Dynamic Thermal Management for Multimedia Applications", *Proceedings, 17th Annual International Conference on Supercomputing (ICS '03)*, (Jun. 2003), 109-120.

\* cited by examiner

METHODS AND APPARATUS FOR OPTIMAL VOLTAGE AND FREQUENCY CONTROL OF THERMALLY LIMITED SYSTEMS

This application is a continuation of U.S. patent application Ser. No. 10/934,295, filed on Sep. 3, 2004, now issued as U.S. Pat. No. 7,141,953, which claims the benefit of priority to U.S. Provisional Patent Application Ser. No. 60/500,561, filed on Sep. 4, 2003, both of which are incorporated herein by reference.

TECHNICAL FIELD

Various embodiments described herein relate generally to controlling the performance of systems having a thermal limitation that relates to the performance rate, and more specifically to electronic devices such as integrated circuits and other thermally limited systems such as electric motors and combustion engines.

BACKGROUND INFORMATION

Many electronic and mechanical devices have performance limitations that relate to a maximum allowable temperature of operation. It is known in integrated circuit devices ("ICs") that higher system cycle rates result in increased system performance, but they also result in increased heating of the IC device. This heating may be an issue in some applications, because it results in decreased reliability and decreased IC lifetime. It is known to attach high thermally conductive materials to ICs to form improved heat-dissipation structures, generally known as heat sinks, in order to increase the performance rate of the IC without exceeding the thermal limitation. In the case of an IC, the junction temperature may be the thermal limit. This thermal issue may be very serious in certain applications, since operating an IC at a rate that causes the junction temperature to exceed the allowed limit for the particular technology, results in a greatly decreased IC lifetime. There may be a typically exponential decrease in lifetime as a function of small linear increases in junction temperature for many types of ICs, as well as for many other systems such as electric motors.

The use of heat-dissipating devices improves the thermal limitation capability in ICs and in other electronic devices, by reducing the temperature difference between the outside ambient temperature and the junction area deep within the IC. This may be known as the junction to ambient temperature difference $\theta_{JA}$. Even though the performance rate of an IC can be increased without exceeding the junction temperature thermal limit by means of a heat-dissipating device, there may still be a need to increase the performance rate to as high a level as possible. In addition, the use of heat-dissipation structures is expensive, adds yet another component subject to failure to the overall system, adds another step to the assembly process, may require mechanical devices such as fans be added to the system, and may take up more space than may be allowed in personal electronic devices.

Thus there is a need to find methods and apparatus to control the performance rate of an electronic device to a performance level that is as high as it can be, but without exceeding the thermal limitation. This need exists in electronic devices such as ICs that cannot practically employ heat dissipation structures, and in ICs that use heat-dissipation structures but need to optimize their performance rate to the best possible rate in order to obtain a competitive edge in the market. The need to control and optimize the performance rate exists in electrical systems as well as in electronic devices, for example a power transformer. The need to control and optimize the performance rate may also exist in mechanical systems as well as electrical systems, such as a motor operating an electrical generator. Any system that has a thermal limitation that relates to a controllable performance value may need to optimize its performance under various demand levels, while not exceeding the thermal limitation at any time.

DETAILED DESCRIPTION

Figure 1:
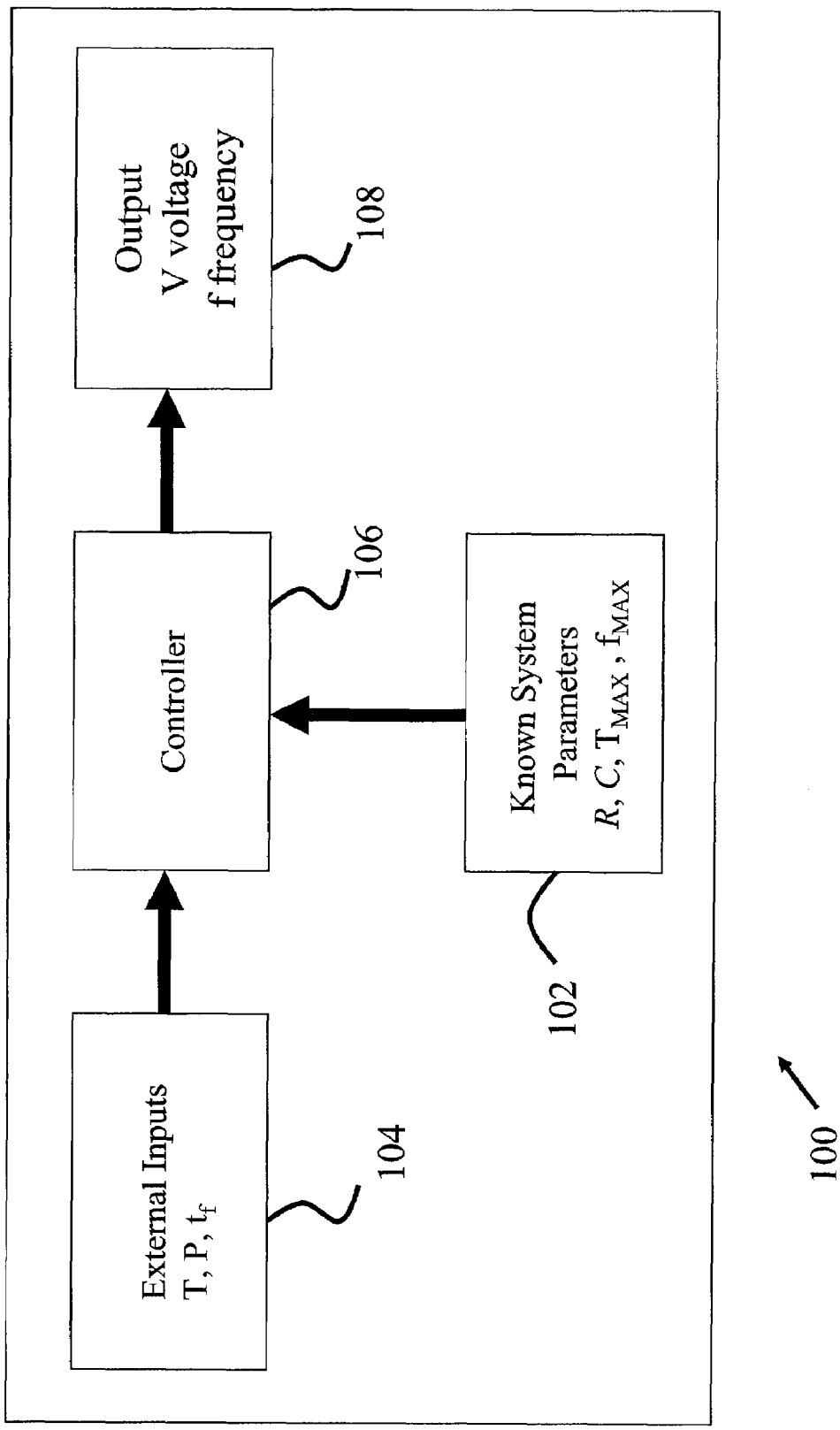
FIG. 1 is a block diagram of an exemplary embodiment.

In the following detailed description of embodiments of the inventive subject matter, reference is made to the accompanying figures that form a part thereof, and in which is shown by way of illustration, specific preferred embodiments in which the inventive subject matter may be practiced. These embodiments are described in sufficient detail to enable those skilled in the art to practice the inventive subject matter, and it is to be understood that other embodiments may be utilized and that mechanical, compositional, structural, electrical, and procedural changes may be made without departing from the spirit and scope of the inventive subject matter. The following detailed description is, therefore, not to be taken in a limiting sense, and the scope of the inventive subject matter is defined only by the appended claims. In the drawings, like numerals describe substantially similar components.

When the term "voltage" is used herein, it refers to a comparative value in a power supply level, and the use of the term "ground" herein refers to the reference voltage level. The term "frequency", as used herein, refers to a rate of a repeating action, such as the number of times per second that an IC cycles through a series of operations, or the clock rate of an IC, or a number of revolutions made by a mechanical object such as a rotating drive shaft.

FIG. 1 is a block diagram of an exemplary embodiment. In FIG. 1, a system 100 having a thermal limit that depends upon a controllable performance rate of the system is shown. Such a system may illustratively be an IC such as a microprocessor. Microprocessors may typically have varying workloads or amount of time that they are actively engaged in making calculations at a very high performance rate. At certain time periods the microprocessor may be operating at a maximum possible operating rate that depends upon the technology level of the microprocessor, the operating voltage, the clock rate, etc.

In many situations the maximum possible operating rate cannot be maintained for a long period without the microprocessor exceeding the maximum junction temperature limit. Further, the environment in which the microprocessor is operating will affect how long the microprocessor may be able to operate at the maximum possible operating rate before the thermal limit is reached. For example, the microprocessor may be part of a parallel processor system in an air-conditioned computer room, with fans blowing cooled air over the heat sink, in which case the ambient temperature will be lower and consequently the temperature of the junctions in the microprocessor will be lower than it would if it were operating in a hot environment. Thus the length of time that the microprocessor may be able to operate at the maximum possible rate may be longer. The same model microprocessor may alternatively be part of a laptop battery-operated computer having no fan, and operating in a high temperature location. In this case, the length of time that the microprocessor can operate before reaching the thermal limit will be shorter, and the thermal limit may be reached before the period of high operating rate ends.

As a result of the above noted variations in microprocessor operating rates depending upon the workload demands, it may be possible to allow the microprocessor to operate at a greater performance rate than the rate that would enable it to always remain below the junction temperature limit for short periods of time. This may be possible, for example, if the operating rate for the preceding period of time was low enough that the current junction temperature is well below the thermal limit at the start of the high operating rate period. This gap, between the maximum allowable junction temperature and a present value of junction temperature, may allow the microprocessor to operate at a maximum performance rate, or at least a higher performance rate, for short periods of time, until the time when the junction temperature begins to approach the limit.

A method of controlling the operating rate of a microprocessor that uses a current measurement of the microprocessor junction temperature to determine how fast to allow the microprocessor to operate for a subsequent time period may be called dynamic thermal management ("DTM"). Several methods may be used to dynamically control the performance rate of a microprocessor, such as clock gating or power supply voltage level reduction (known as dynamic voltage scaling, "DVS"). One method of DTM is to operate the microprocessor at the maximum possible operating rate until the measured junction temperature reaches the maximum allowable level. Then the microprocessor may be reduced in performance to an operating level that allows the junction temperature to be lowered to a safe level, and then the microprocessor may be operated at the maximum allowable level again. In many cases this DTM process does not result in the maximal performance over the time period that a typical high level workload exists for the microprocessor. The optimum rate at which to operate a microprocessor, or any thermally limited system, will depend upon one or more external factors such as the ambient temperature, and upon one or more inherent features of the microprocessor technology, such as the thermal resistance to heat flow from the IC junction to the ambient air.

FIG. 1 shows that inputting known physical parameters 102 of the particular system (such as the thermal resistance R and the thermal capacitance C of the IC, the maximum temperature the particular IC technology can sustain without undue decrease in lifetime $T_{MAX}$, and the maximum performance rate $f_{MAX}$ of the technology used in the IC), in conjunction with measuring and providing certain external inputs 104 (such as the temperature T, the power consumption P and the estimated time $t_f$ that the current performance load rate will continue), to a controller 106, it is possible to calculate an optimal time-varying performance rate that may optimize the performance of the system 100. This exemplary system 100 uses a simple thermal model to calculate a present desired value of performance frequency f that will output the best possible overall system performance for the time period $t_f$, under the assumption that during the time period $t_f$ the input demanded of the system remains relatively constant.

As used herein, "controller" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit. In some embodiments, the functions of a controller may be performed by the device, apparatus, or system whose operational frequency is being controlled. In other embodiments, the functions of the controller may be performed by an independent element.

The output 108 of the controller 106 is a desired value of a controllable performance factor (r), such as a frequency f which may be controlled in certain illustrative embodiments of the invention by either small increments, or essentially continuous variations, of the power supply voltage to the illustrative microprocessor. In another illustrative embodiment the output 108 might alternatively be a torque applied to the drive wheel so f a train, and the control variable might be the combustible gas flow to a turbine engine. Numerous other illustrative examples may be imagined by one of skill in the art. The value of the controllable performance factor r may be determined by the following equations, which will be developed in the remainder of this description. In the case where r is an operating frequency, i.e., where r=f, the frequency $f=[1/\alpha-1)kR)(T_m-T\ e^{-t/RC})/(e^{-t/RC}-e^{-(\alpha/(\alpha-1))t/RC})]^{1/\alpha}$, where the value $\alpha=2\beta+1$, and where $\beta$ is a constant at a given operating voltage determined by $V=kf^\beta$, and k is a proportionality constant of the system.

Figure 2:
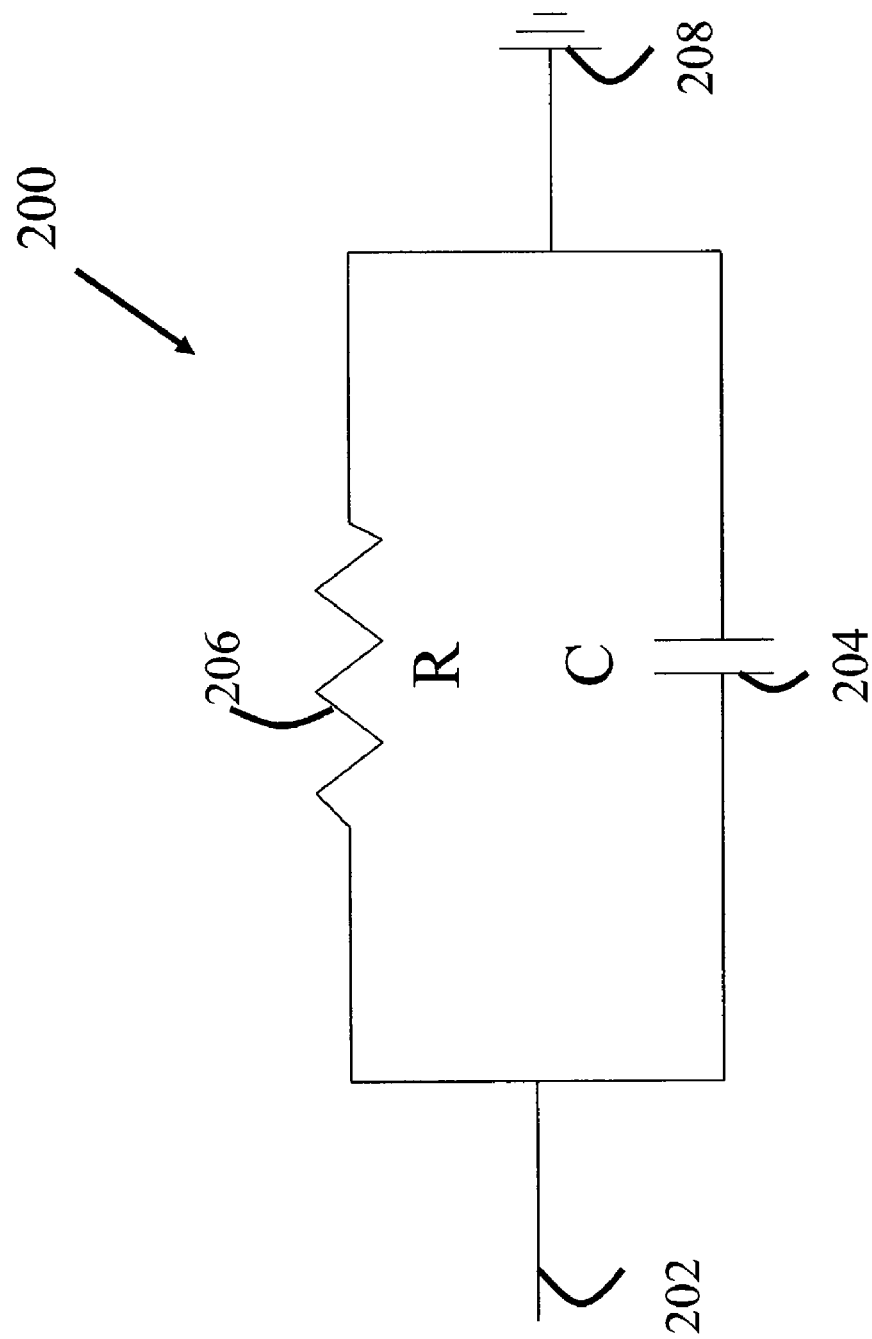
FIG. 2 is a schematic diagram of a mathematical model of an exemplary embodiment.

FIG. 2 is a schematic diagram of a mathematical model of an exemplary embodiment. The model uses a simple passive component electrical circuit model for the thermal currents that flow in a system having controllable performance-regulating features. The thermal circuit 200 has an input 202, which may be viewed as being the power consumption P(t) of the system 200 as a function of time. The power consumption or dissipation controls the temperature T(t) of the system as a function of time, so from a thermal point of view the input 202 may represent the current, while the junction temperature, in an illustrative embodiment of a microprocessor or other IC device or system, may represent the voltage difference between the points 208 and 202. The thermal capacitance C, 204, and the thermal resistance R, 206, are coupled in parallel in this illustrative embodiment of the thermal model, and the output to ground 208 may represent the ambient temperature around the IC package in this illustrative embodiment of the thermal model.

Applying Kirchoff's and Ohm's laws to the circuit of FIG. 2 results in $dT/dt=(P/C)-(T/\tau)$, where $\tau=RC$. If the relationship between the voltage V and the frequency f in this illustrative embodiment of the system 200 results in the power P being proportional to the voltage squared times the frequency, i.e., $P=k(f*V^2)$, and if adjusting the system voltage V controls the frequency of the system 200 such that $V=kf^\beta$, where $\beta \geq 0$, then the power $P=kf^\alpha$, where k is a proportionality constant that is characteristic of the particular technology, and where the value $\alpha=2\beta+1$.

Solving these equations for the thermal behavior of the system 200 for a maximum allowable temperature $T_m$ results in what may be called a natural frequency of the system, which is the maximum frequency at which the system can operate to stay exactly at the maximum allowable temperature. This natural frequency is the highest frequency the system can operate at for long periods of time, and it is a function of the basic parameters of the specific system. These parameters include the transistor technology, the thermal resistance and capacitance of the IC and packaging, and the environment in which the system operates, such as temperature T and the power dissipation. Thus the natural frequency of the system is $f_{nat}=(T_m/kR)^{1/\alpha}$. If the maximum possible operating frequency $f_m$ of a particular system is lower than the $f_{nat}$ calculated for the current environment, then clearly the optimum operation is at frequency $f_m$ since it is lower than the natural frequency for the operating environment of the current time period. Therefore, we will now assume that the maximum possible frequency that the system is capable of achieving is greater than the natural frequency $f_{nat}$ of the current time period. It should be noted that the thermal model of this embodiment is directly applicable to many other possible embodiments, such as combustion engines.

With such a thermal model, the optimum rate of power consumption for any period of time (i.e., $t_f$, known as the available time) during which the output performance of the system is likely to remain relatively constant may be calculated. Such time periods $t_f$ may be very short, as in the illustrative embodiment of a microprocessor, but a knowledge of how long typical high workload conditions last may allow sufficiently accurate estimates of the time period for which the optimum operating frequency is to be calculated.

Such an arrangement, in which the control input to the system is essentially continuously changing to improve the overall performance of the system during the upcoming time interval, may result in a better average performance for the system as compared to a simple on/off DTM system. A simple on/off DTM system might have a built-in thermocouple on an IC continuously checking the junction temperature. The microprocessor might operate at a maximum possible rate until the thermal limit is detected by the thermocouple, and then the operating rate may be divided in half, perhaps using the system clock rate, and thus be operating at a frequency that allows the junction temperature to drop. When the junction temperature drops to a predetermined point, the clock rate might be increased to maximum operating rate until the thermocouple again indicates that the junction temperature has reached the thermal limit, and so on. Such a system would have an operating curve that looks like a square wave of varying period. A concern with a simple on/off DTM system is that the lower operating rate needs to be preselected in the absence of a method of calculating the correct lower operating speed in light of the current external conditions and the period of time in which the current workload will likely continue. Thus the present arrangement may result in improved operation over a simple on/off DTM system.

Figure 3:
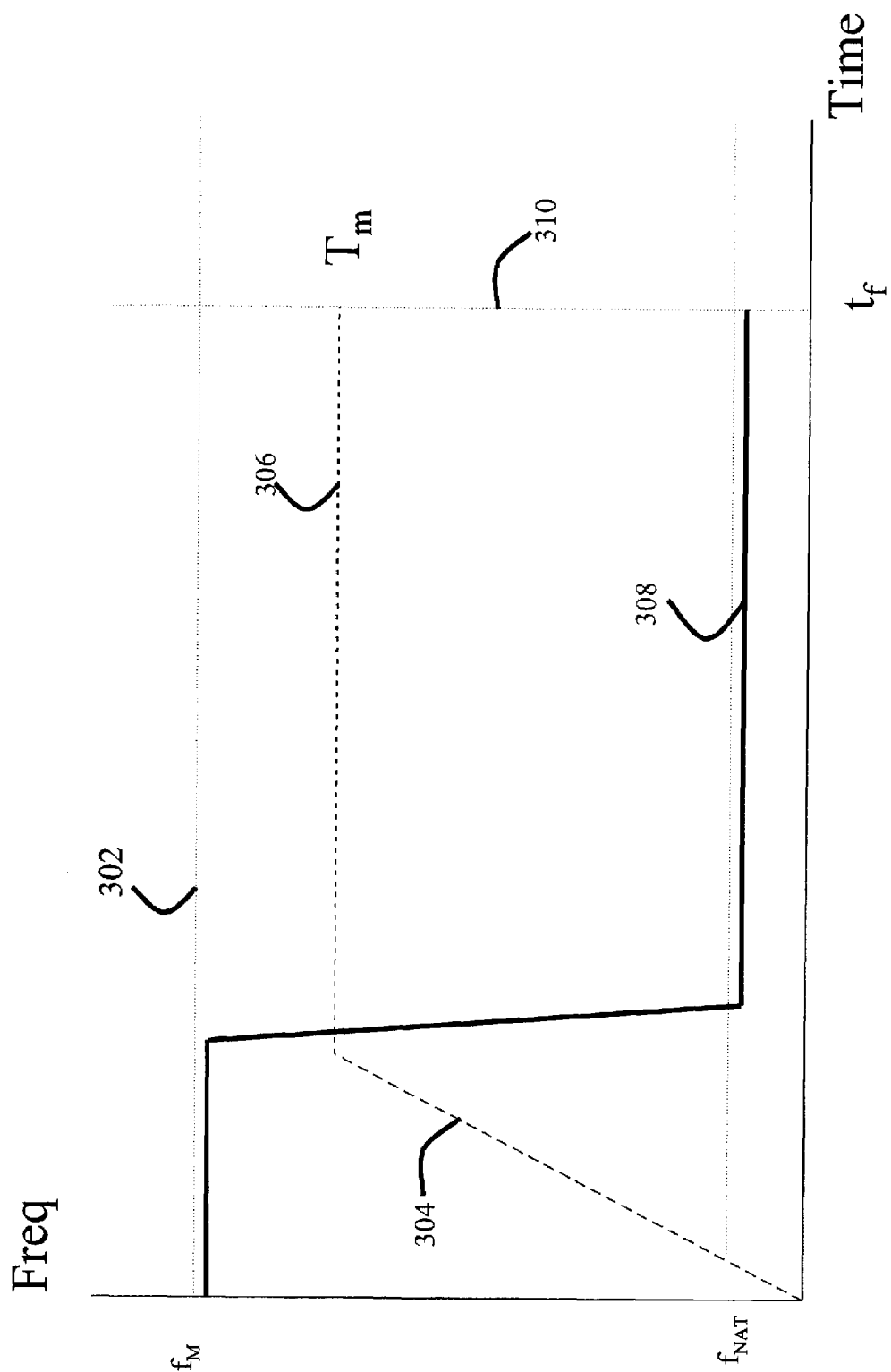
FIG. 3 is a graph of time versus frequency and temperature of an exemplary embodiment.

FIG. 3 is a graph of time versus frequency and temperature of an exemplary system. FIG. 3 represents a graphical representation of a first illustrative example of the operation of a system in the case where the relationship of power to the frequency, $P=kf^\beta$, is a linear relationship, that is $P=kf$. This may be known as clock-throttling. In this case, the voltage has no impact on the frequency of operation, and the system is controlled by setting the clock rate. The system operates at its maximum operating frequency $f_m$, 302, while the temperature of the junction rises at a rate or slope depending upon the thermal conductivity of the system, and of the operating environment, shown as the dashed line 304, until the time when the temperature reaches the maximum allowable temperature $T_m$, shown as the horizontal line 306. Then the clock rate is adjusted to be equal to the calculated value $f_{nat}$, shown as the horizontal line 308, until the end of the calculated time period $t_f$, shown as the vertical line 310.

Figure 4:
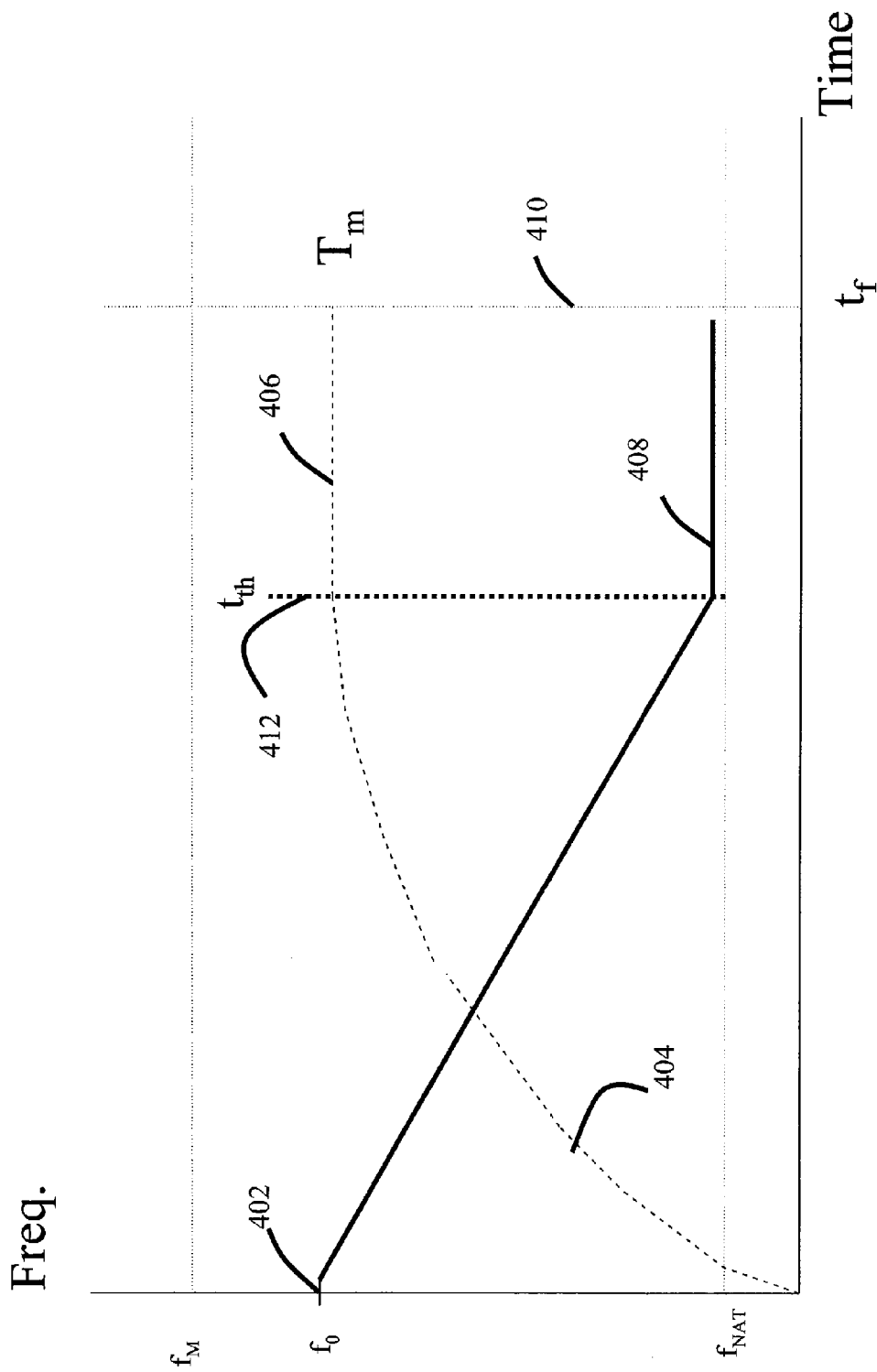
FIG. 4 is a graph of time versus frequency and temperature of another exemplary embodiment.

FIG. 4 is a graph of time versus frequency and temperature of another exemplary embodiment. FIG. 4 represents another graphical representation of an embodiment of a more general and unconstrained system, known as the DVS case. This illustrative example describes a situation frequently found in ICs that can operate at such high frequency that the thermal limit of junction temperature may be exceeded during high workload time periods. In this illustrative example, the frequency of the system is controlled by adjusting the voltage on an essentially continuous basis, starting from a calculated initial frequency for the time period $f_0$, 402 while the temperature of the junction in this illustrative embodiment is seen as a function of time, 404. The temperature is seen to be rising since the initial frequency is greater than the calculated value $f_{nat}$ 408, the frequency at which the system will always stay below the maximum allowable temperature 406. As the frequency decreases, it may be seen that the temperature increases and the slope 404, decreases as it approaches the maximum allowable temperature $T_m$, shown as the horizontal line 406. The temperature reaches the maximum level 406 at the same time that the frequency reaches the calculated value $f_{nat}$, 408, at a time labeled $t_{th}$, known as the threshold time 412, which continues until the end of the calculated time period 410.

It should be noted that if the device monitoring the system power dissipation, such as the external inputs 104 from FIG. 1, measures a power level that has shifted by more than a specified amount, such as 10%, from the power value at the start of the time period, then the recalculation of the frequency may be initiated immediately, rather than waiting for the end of the calculated time period $t_f$, 410. It should also be noted that the variation of the frequency may be continuous, even though FIG. 4 may show abrupt changes of slope at certain points in the figure, and that in the general case the frequency may decline from the initial frequency at an exponential rate by the factor $e^{-t/((\alpha-1)RC)}$, thus depending on the thermal resistance and capacitance of the system. It should also be noted that an estimation of the rate of frequency decline may be obtained by use of a linear approximation in cases where the voltage is linearly related to the frequency. The rate of frequency decline may alternatively be obtained in non-linear cases by use of the Taylor expansion series with an accuracy of 0.04, or 4%.

Figure 5:
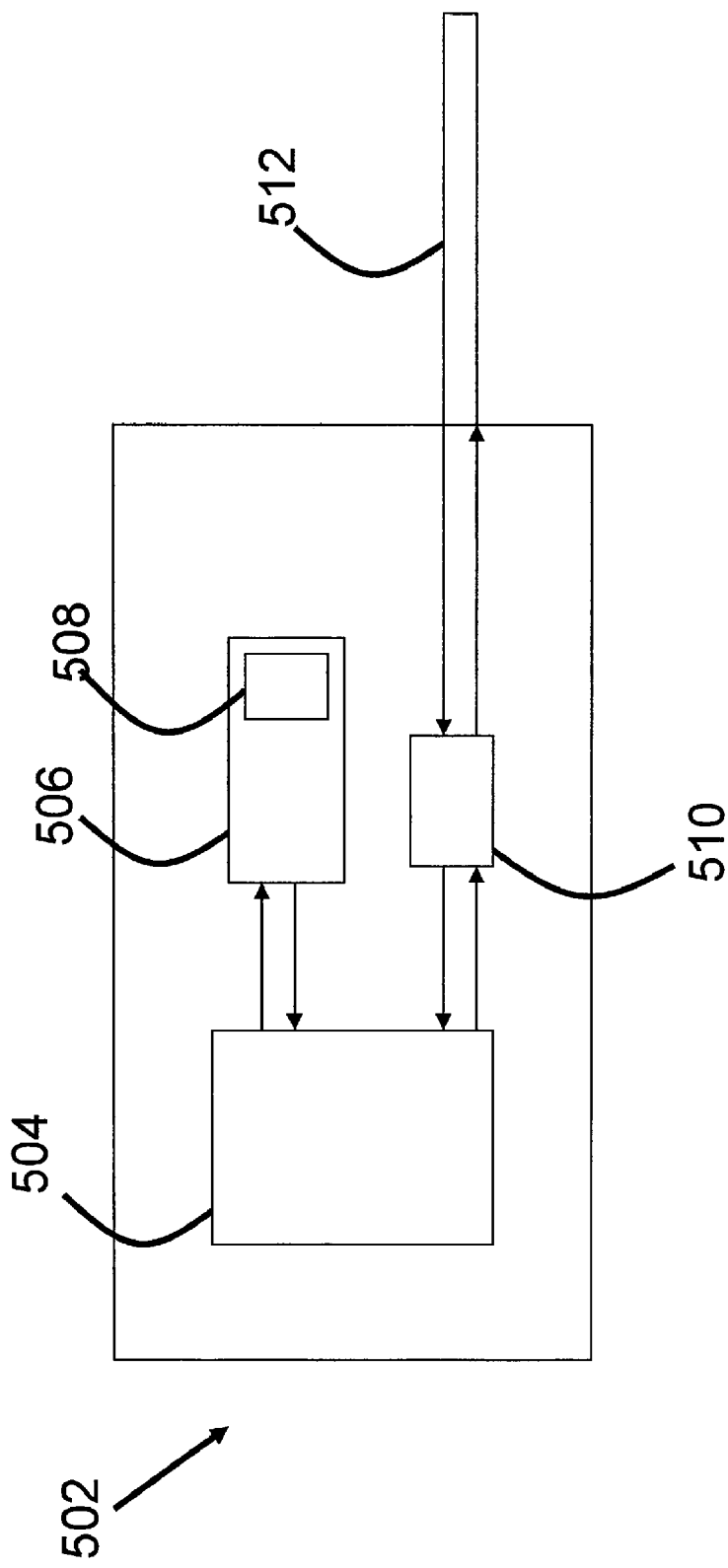
FIG. 5 is a block diagram of an article of manufacture according to various embodiments of the invention.

FIG. 5 is a block diagram of an article of manufacture 502 according to various embodiments of the invention. The article of manufacture 502 may comprises one or more of a number of possible elements, such as a communications network, a computer, a memory system, a magnetic or optical disk, some other information storage device, and/or any type of electronic device or system. The article 502 may comprise at least one processor 504 coupled to a machine-accessible medium such as a memory 506, storing associated information (e.g., computer program instructions 508, and/or other data), and an input/output driver 510 coupled to an external electrical device by various elements, such as a bus or cable 512, which when accessed, results in a machine performing such actions as calculating a solution to a mathematical problem. Various ones of the elements of the article 502, for example the processor 504, may have thermal limitation issues and may use embodiments of the invention to help alleviate and moderate the thermal situation by controlling the operating rate at the optimal frequency. As an illustrative example, the processor 504 may be arranged with an onboard temperature measuring device such as a diode junction, and with an onboard power dissipation measuring device, and it thus may be able to calculate the most efficient operating voltage to control the frequency of the processor 504, using methods such as those discussed and shown previously in FIGS. 3 and 4. With such an arrangement, the processor 504 may respond to the varying calculation requirements of the article 502 at the maximum possible rate compatible with not exceeding the junction temperature limit.

Alternatively, the article 502 may comprise a portion or an element of a communications network in two-way communications with other elements of the network by means of the bus or cable 512, or by wireless communications elements included in I/O driver 510, or use both cable and wireless elements. In this illustrative example of an element of a communications network, the two-way wireless communications apparatus may include a dipole antenna, a monopole antenna, a unidirectional antenna, a laser infrared "IR" diode emitter/detector, or any other suitable type of communication structure. The processor 504 may accept signals from the I/O driver 510 and perform an operation under the control of a program in memory 506, or computer program instructions 508.

Figure 6:
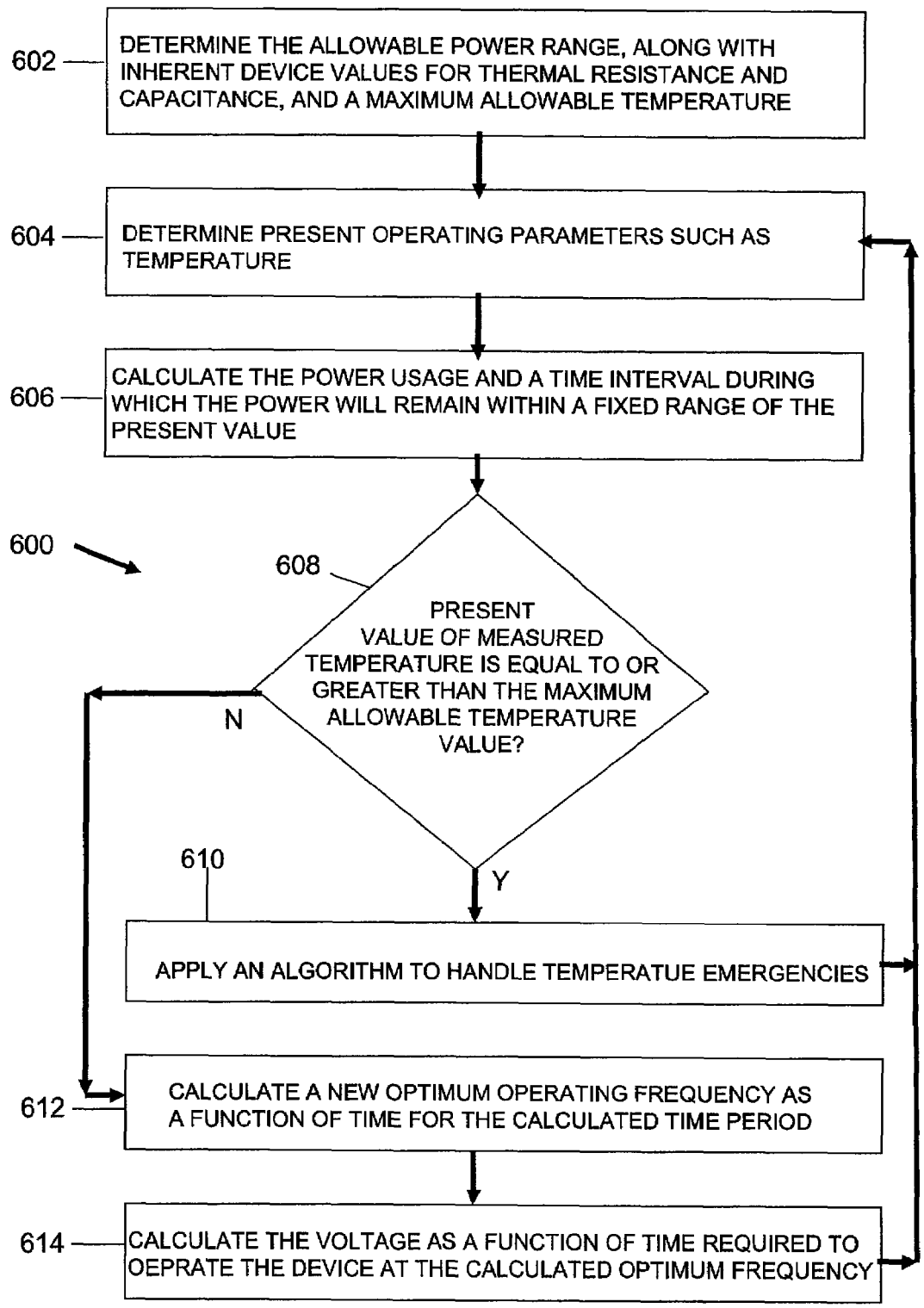
FIG. 6 is a flow diagram illustrating several methods according to various embodiments of the invention.

FIG. 6 is a flow diagram illustrating several methods according to various embodiments.

In 602, the allowable power consumption range, along with inherent device values for thermal resistance and capacitance, and a maximum allowable temperature, are determined. These values may be provided, for example, using one or more controllers and/or information storage units.

In 604, selected present operating parameters, such as device temperature, are determined. Other present operating parameters, such as voltage level, current usage, and the operating frequency, may also be determined. The selected operating parameters may be determined in any suitable manner and through any suitable element(s) or unit(s). For example, they may be provided by suitable sensors, meters, or gauges, and/or by accessing them from one or more memory elements.

In 606, the power consumption and a time interval during which the power consumption will remain within a fixed range of the present value are calculated. This may be performed, for example, using one or more controllers and/or information storage units.

In 608, the present value of measured temperature is compared with the maximum allowable temperature value. If the present temperature value is equal to or greater than the maximum allowable temperature value, the method goes to 610.

In 610, a selected algorithm to handle temperature emergencies is applied, such as clock throttling. The method flow then returns to 604 and continues until such time as the present value of measured temperature may be determined at 608 to be below the stored maximum allowable temperature value, in which event the method flow goes to 612.

In 612, a new optimum operating frequency as a function of time for the calculated time interval of 606 is calculated.

In 614, the voltage as a function of time required to operate the device at the calculated optimum frequency as a function of time is calculated. The method then returns to 604.

It should be noted that the individual activities shown in the flow diagrams do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated.

There are numerous other devices and systems that may benefit from the use of the described embodiments. Any system having a performance rate controllable by a combination of inputs, such as input voltage and current, and a limitation that is a measurable quantity may use this method. The inventive subject matter has been described using a simple illustrative example of a microprocessor with a varying workload and a maximum operation rate that will cause the microprocessor to eventually overheat, depending upon the system parameters and environment. The disclosed subject matter is not so limited, and it may be applied to other thermally limited systems and to systems having non-thermal limits. Examples of such systems include, but are not limited to, electric motors driving a train, internal combustion engines driving variable loads, turbine engines and steam turbines driving electrical generators, and a rocket engine.

The accompanying figures that form a part hereof show by way of illustration, and not of limitation, specific embodiments in which the inventive subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of the various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope of meaning of the claims. In addition, in the foregoing Detailed Description, it may be seen that various features are grouped together in a single embodiment for the purpose of streamlining this disclosure and increasing its clarity. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   determining operating parameters in a system having a thermal constraint that is dependent upon a controllable performance rate of the system;
   further comprising optimizing the performance rate while not exceeding the thermal constraint;
   wherein the system includes at least one of a semiconductor device, a power transformer, a steam engine, an electric motor, a turbine, and an internal combustion engine;

wherein the controllable performance rate of the system includes at least one of an output voltage, an output current, an output power, revolutions per minute, an output pressure, operations per second, calculations per second and operating frequency; and wherein the performance rate is controlled by at least one of an operating voltage level, an operating current level, an input power level, a clock rate, a thermal input flow rate, an input fuel flow rate and an input oxidizer flow rate;

wherein further a natural operating frequency ($f_{nat}$) of the system operating at a maximum allowable temperature ($T_m$) is calculated for a current set of operating conditions including a thermal resistance (R), a thermal capacitance (C), a voltage (V), an initial temperature ($T_0$) and a power consumption (P) of the system, wherein $f_{nat}=(T_m/kR)^{1/\alpha}$, where $\alpha$ is an exponent of the operating frequency (f) of the system proportional to the power consumption (P) and a system proportionality constant (k), where $P=kf^\alpha$.

2. An article comprising a machine-accessible medium having associated instructions, wherein the instructions, when accessed by a machine, result in the machine performing the following actions:

determining an operating parameter in a system having a thermal constraint that is dependent upon a controllable performance rate of the system;

further including an electronic system comprising a microelectronic device, the thermal constraint comprises a maximum junction temperature ($T_{MAX}$), the controllable performance rate comprises an operating frequency (f), and wherein the instructions, when accessed, further result in the machine performing:

controlling a performance of the system by calculating f as a function of operating parameters including time (t), temperature (T), maximum temperature ($T_m$), system power (P), voltage (V), thermal resistance (R), and thermal capacitance (C), and by recalculating f at predetermined time intervals or if P changes by a predetermined amount;

further comprising the electronic system calculating the operating frequency determined by $f=[(1/(\alpha-1)kR)(T_m-T\ e^{-t/RC})/(e^{-t/RC}-e^{-(\alpha/(\alpha-1))t/RC})]^{1/\alpha}$, where the value $\alpha=2\beta+1$, and where $\beta$ is a constant at a given operating voltage determined by $V=kf^\beta$, and k is a proportionality constant of the system.

3. A method of controlling a system, comprising:

determining operating parameters in a system having a thermal constraint that is dependent upon a controllable performance rate of the system;

optimizing the performance rate while not exceeding the thermal constraint by calculating a present performance rate at regular time intervals determined by a typical time for the system to remain at a stable temperature; and adjusting the performance rate by controlling an input variable selected from a list including voltage, current, power, fuel flow rate, oxidizer flow rate, thermal energy flow rate and clock rate;

wherein the thermal constraint is directly measurable and includes at least one of a junction temperature, a combustion chamber temperature, a maximum conductor temperature, and a maximum case temperature maximum junction temperature $T_{Jmax}$;

the controllable performance rate (r) comprises at least one of an operating frequency (f) an output voltage, an output current, an output power, revolutions per minute, an output pressure, operations per second, and calculations per second; and controlling the performance of the system comprises calculating the performance rate (r) as a function of operating parameters including time (t), present temperature (T), maximum temperature ($T_m$), system power (P), voltage (V), thermal resistance (R) and thermal capacitance (C), and recalculating the performance rate if measured temperature changes by a predetermined amount, wherein voltage includes one of electrical voltage and system pressure;

wherein calculating the performance rate (r) is determined by $r=[(1/(\alpha-1)kR)(T_m-T\ e^{-t/RC})/(e^{-t/RC}-e^{-(\alpha/(\alpha-1))t/RC})]^{1/\alpha}$, where the value $\alpha=2\beta+1$, and where $\beta$ is a constant at a given operating voltage determined by $V=k\,r^\beta$, where $\beta\geq0$, and k is a proportionality constant of the system.

* * * * *

UNITED STATES PATENT AND TRADEMARK OFFICE
CERTIFICATE OF CORRECTION

PATENT NO. : 7,586,281 B2  Page 1 of 1
APPLICATION NO. : 11/459407
DATED : September 8, 2009
INVENTOR(S) : Cohen et al.

It is certified that error appears in the above-identified patent and that said Letters Patent is hereby corrected as shown below:

In column 10, line 23, in Claim 3, delete "(f)" and insert -- (f), --, therefor.

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,586,281 B2 |
| APPLICATION NO. | : 11/459407 |
| DATED | : September 8, 2009 |
| INVENTOR(S) | : Cohen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 314 days.

Signed and Sealed this

Fourteenth Day of September, 2010

David J. Kappos
*Director of the United States Patent and Trademark Office*